United States Patent [19]
Yagi et al.

[11] Patent Number: 5,317,067
[45] Date of Patent: May 31, 1994

[54] MOLDING AND PUNCHING OUT MELT-MIXED EPOXY RESIN-THERMOPLASTIC RESIN COMPOSITION WITH HARDENER

[75] Inventors: Koji Yagi; Seiichi Fukunaga, both of Ibaraki, Japan

[73] Assignee: Tokyo Tire & Rubber Company Limited, Tokyo, Japan

[21] Appl. No.: 829,380

[22] Filed: Feb. 3, 1992

Related U.S. Application Data

[60] Continuation of Ser. No. 432,321, Nov. 6, 1989, abandoned, which is a division of Ser. No. 237,397, Aug. 29, 1988, abandoned.

[30] Foreign Application Priority Data

Jan. 25, 1988 [JP] Japan ................. 63-15406
May 31, 1988 [JP] Japan ................ 63-134595

[51] Int. Cl.⁵ .................. C08L 63/02; C08L 63/04
[52] U.S. Cl. ...................... 525/438; 525/109; 525/113; 525/114; 525/118; 525/119; 525/121; 525/122; 525/396; 525/423; 525/454; 525/463; 525/476; 525/481; 525/485; 525/486; 525/488; 525/524; 525/527
[58] Field of Search .......... 525/438, 109, 113, 114, 525/118, 119, 121, 122, 396, 423, 454, 463, 476, 481, 485, 486, 488, 524, 527

[56] References Cited

U.S. PATENT DOCUMENTS

| | | | |
|---|---|---|---|
| 3,211,695 | 10/1965 | Peterson | 525/524 |
| 3,641,195 | 2/1972 | Boll et al. | 525/524 |
| 4,222,918 | 9/1980 | Zentner et al. | 525/396 |
| 4,608,404 | 8/1986 | Gardner et al. | 525/396 |
| 4,656,208 | 4/1987 | Chu et al. | 525/438 |
| 4,661,559 | 4/1987 | Gardner et al. | 525/423 |

FOREIGN PATENT DOCUMENTS 62-1721 1/1987 Japan ................. 525/396

Primary Examiner—Robert E. Sellers
Attorney, Agent, or Firm—Larson and Taylor

[57] ABSTRACT

The present invention provides an epoxy resin composition which is obtained by melt-mixing 100 parts by weight of an epoxy resin with 3 to 33 parts by weight of a thermoplastic resin alone or in combination with other components and additives than a hardener in the first mixing step and then with a hardener alone or in combination with other components and additives in the second mixing step, said epoxy resin having a number-average molecular weight of at least 200 and lower than 5000 and said thermoplastic resin having a number-average molecular weight of at least 5000; an adhesive epoxy resin molded article which is obtained by molding said epoxy resin composition; a process for producing an adhesive epoxy resin molded article which comprises molding said epoxy resin composition into a 0.01 to 10 mm thick film or sheet in a substantially uncured state and subsequently punching the film or sheet at temperatures higher than 15° C. and lower than 70° C.; and a process for performing bonding and sealing with said molded article.

2 Claims, No Drawings

MOLDING AND PUNCHING OUT MELT-MIXED EPOXY RESIN-THERMOPLASTIC RESIN COMPOSITION WITH HARDENER

This application is a continuation of application Ser. No. 432,321 filed Nov. 6, 1989 (now abandoned) which is a division of application Ser. No. 07/237,397 filed Aug. 29, 1988 (now abandoned).

The present invention relates to an epoxy resin composition to be used as an adhesive and sealant, a molded article thereof, a process for producing said molded article, and process of performing bonding and sealing with said molded article.

Recently, there is an increasing need of bonding and sealing small parts such as electronic parts. To meet this need, it is necessary to apply an adhesive to a comparatively small area of an adherend. A liquid adhesive is not good for such usage because it easily swells out or leaves voids on account of incomplete filling. In addition, a liquid adhesive does not fully meet the requirement that electronic parts should be bonded with a thermosetting adhesive in many cases, because it is hard to handle on account of the viscosity change and gelation which occur as the hardening reaction proceeds. In such a case, a solid preformed adhesive is used. Conventional solid thermosetting adhesives are produced by dry-blending a powder thermosetting resin with components, additives, and a hardener, and forming the resulting powder mixture into molded articles by means of a tablet press. The thus formed molded articles are brittle and liable to chipping; therefore, they are limited in shape and size and often unsuitable for bonding small parts. An additional disadvantage of conventional solid adhesives is that they break during transportation before their use and their broken chips contaminate adherends. Moreover, conventional solid adhesives formed by tamping down a powder adhesive form, after melting and bonding, an adhesive layer which contains many voids. Therefore, they are not regarded as highly reliable adhesives.

It is an object of the present invention to provide an adhesive epoxy resin composition which is in a substantially uncured state and also to provide a molded article of such an epoxy resin composition. The molded article has a small size and shape, resists breakage, yields only a little amount of powder in rubbing, and leaves no voids in the adhesive layer after melting and bonding.

It is another object of the present invention to provide a process for producing the molded article and also to provide a process for performing bonding and sealing with the molded article.

The above and other objects of the invention will become apparent from the following description.

The present invention relates to an epoxy resin composition which is obtained by melt-mixing 100 parts by weight of an epoxy resin with 3 to 33 parts by weight of a thermoplastic resin alone or in combination with other components and additives than a hardener in the first mixing step and then with a hardener alone or in combination with other components and additives in the second mixing step, said epoxy resin having a number-average molecular weight of at least 200 and lower than 5000 and said thermoplastic resin having a number-average molecular weight of at least 5000; an adhesive epoxy resin molded article which is obtained by molding said epoxy resin composition; a process for producing an adhesive epoxy resin molded article which comprises molding said epoxy resin composition into a 0.01 to 10 mm thick film or sheet in a substantially uncured state and subsequently punching the film or sheet at temperatures higher than 15° C. and lower than 70° C.; and a process for performing bonding and sealing with said molded article.

The epoxy resin having a number-average molecular weight (hereinafter referred to simply as "molecular weight") of at least 200 and lower than 5000 as specified in the present invention includes, for example, bisphenol-A type epoxy resin [Epikote 828, 834, 1001, 1002, 1003, 1004, 1005, 1007, 1010, 1100L, etc., products of Yuka Shell Epoxy Co., Ltd.], brominated bisphenol-A type epoxy resin [Epikote 5050, 5051, 5051H, etc., products of Yuka Shell Epoxy Co., Ltd.], o-cresol novolak type epoxy resin [ESCN-220L, ESCN-220F, ESCN-220H, ESCN-220HH, etc., products of Sumitomo Chemical Co., Ltd.], brominated novolak type epoxy resin [BREN-S etc., products of Nippon Kayaku Co., Ltd.], phenol novolak type epoxy resin [ESPN-180 etc., products of Sumitomo Chemical Co., Ltd.], and modified epoxy resins thereof. They may be used in combination with one another. An epoxy resins having a molecular weight lower than 200 or an epoxy resin like B-stage epoxy resin having a molecular weight higher than 5000 may be used in this invention if an epoxy resin mixture containing it has a molecular weight of at least 200 and lower than 5000. The epoxy resin used in this invention should preferably have a molecular weight of 1000 to 2000.

With a molecular weight lower than 200, the epoxy resin provides, after incorporation with 3 to 33 parts by weight of a thermoplastic resin having a molecular weight of at least 5000, a molded article which is sticky and liable to cause blocking at room temperature. Conversely, with a molecular weight higher than 5000, the epoxy resin has a high melting point and a high melt viscosity, which makes it necessary to set up a high temperature for the second mixing step. This leads to a possibility that the epoxy resin prematurely reacts with a hardener.

Examples of the thermoplastic resins having a molecular weight of at least 5000 include polyamide resins, polycarbonate resins, polyurethane resins, polyester resins, silicone resins, phenoxy resins, vinyl chloride resins, polystyrene resins, ABS resins, polyvinyl alcohol resins, ionomer resins, methacrylate resins, polyphenylene oxide resins, and chlorinated polyethylene resin. They also include rubbers such as elastomer, natural rubber, isoprene rubber, butadiene rubber, styrene butadiene rubber, nitrile rubber, chloroprene rubber, silicone rubber, and norbornane polymer.

The above-mentioned thermoplastic resin may have a functional group to react with the epoxy resin in or at the terminal of its molecule, so long as it permits the mixture to remain in a substantially uncured state after the completion of the second mixing stage.

The thermoplastic resin used in this invention is intended to improve the mechanical properties of the molded article. With a molecular weight lower than 5000, the thermoplastic resin does not produce a sufficient improving effect and the resulting molded article is very brittle. Conversely, with a molecular weight higher than 100,000, the thermoplastic resin has a high melting point and high melt viscosity, making it necessary to perform mixing at a high temperature with a large amount of energy. In addition, the molded article containing such a thermoplastic resin does not melt easily upon heating. Therefore, the molecular weight of the thermoplastic resin should preferably be up to 100,000.

The amount of the thermoplastic resin to be added to the epoxy resin should be 3 to 33 parts by weight. With an amount less than 3 parts by weight, the thermoplastic resin produces only a little effect of improving the mechanical strength of the molded article. With an amount in excess of 33 parts by weight, the thermoplastic resin impairs the characteristic properties of the epoxy resin. "Melt-mixing" as used herein means that two components melt and mix with each other or one component melts and the other component disperses in the molten component.

According to the present invention, the epoxy resin and thermoplastic resin are incorporated, in the first mixing step, with components and additives such as fillers, flame retardants, reinforcing materials, lubricants, dispersing agents, surface active agents, pigments, dyes, and coupling agents. Examples of the fillers include inorganic fillers such as mica, silica, glass fiber, glass flake, glass powder, carbon fiber, talc and calcium carbonate, and organic fillers such as aramid fiber and nylon fiber. Examples of the flame retardants include antimony trioxide, aluminum hydroxide, red phosphorus, and halogen compounds. Examples of the lubricants, dispersing agents, and surface active agents include wax, zinc stearate, and silicon oil. Examples of the pigments and dyes include carbon black, red oxide, titanium white, and cyanine blue. Examples of the coupling agents include silane coupling agents and titanium coupling agents. The melt-mixing is accomplished by means of a mixing extruder, heating stirrer, kneader, Banbury mixer, roll mixer, or the like.

According to the present invention, the epoxy resin and thermoplastic resin are incorporated, in the second mixing step, with a hardener alone or in combination with components and additives. Examples of the hardener include amine hardeners, acid anhydride hardeners, phenolic resin hardeners, and catalyst hardeners. They are not specifically limited so long as they undergo curing reactions with the epoxy resin. Preferable among them are those which are solid at room temperature.

Examples of the amine hardeners include diethylenetriamine, triethylenetetramine, bis(hexamethylene)triamine, trimethylhexamethylenediamine, menthenediamine, isophoronediamine, m-xylylenediamine, 3,9-bis(3-aminopropyl-2,4,8-tetraspiro[5.5]undecane, m-phenylenediamine, diaminodiphenylmethane, diaminodiphenylsulfone, 4,4'-methylenebis(2-chloroaniline), and adducts thereof with the epoxy resin. Examples of the acid anhydride hardeners include phthalic anhydride, trimellitic anhydride, pyromellitic anhydride, benzophenonetetracarboxylic anhydride, maleic anhydride, tetrahydrophthalic anhydride, hexahydrophthalic anhydride, methyl nadic anhydride, methylcyclohexenetetracarboxylic anhydride, tetrachlorophthalic anhydride, and tetrabromophthalic anhydride. Examples of the phenol hardeners include phenol, o-cresol novolak, phenol novolak, and phenol aralkyl. The catalyst hardeners include tertiary amines such as benzyldimethylamine, 2,4,6-tris(dimethylaminomethyl)phenol, piperidine, pyridine, and picoline; and imidazoles such as 2-ethyl-4-methylimidazole. Additional examples include 1,8-diazabicyclo[5.4.0]undecene, Lewis acid (such as $BF_3$), dicyanediamide, amineimide, organic acid hydrazide, and mixture, salts, and complex thereof. The amount of the catalyst hardener should be 0.1 to 20 phr for the epoxy resin, and the amount of the other hardeners should be 0.5 to 2 equivalents for the epoxy group.

According to the present invention, the melt-mixing is accomplished in two steps. That is, in the first step, components and additives excluding hardeners are incorporated, and in the second step, hardeners alone or in combination with components and additives are incorporated. The reason why the melt-mixing is performed in two steps is that if the epoxy resin is to be mixed completely with components and additives, it is necessary to perform mixing at a comparatively high temperature for a long time, and there is a possibility that hardeners added during the mixing brings about the curing reaction. In the curing system which employs two or more hardeners, it is possible to add, in the first mixing step, at least one hardener which alone does not bring about curing. For example, in the case of a curing system composed of a phenol novolak hardener and an imidazole hardener, the former is added in the first mixing step and the latter, in the second step, because it is imidazole which promotes the curing reaction predominantly and the phenol novolak hardener is very slow in reaction with the epoxy resin.

In the second mixing step, the hardener can be added in combination with components and additives. However, care should be taken to avoid such a situation in which the mixing temperature is raised or the mixing time is prolonged. The mixing means used in the first mixing step can also be used in the second mixing step. A mixing extruder is preferred to minimize the heat history of the composition.

According to the present invention, the epoxy resin composition formed by mixing as mentioned above is subsequently made into film or sheet in a substantially uncured state. (Film and sheet are simply called sheet hereinafter.) This is accomplished by extrusion, rolling, or coating. In extrusion, the composition is extruded from a sheet die attached to an extruder. In rolling, the composition is rolled by calendering. In coating, the composition in the form of melt or solution is cast onto a release substrate using a coating machine. The sheet may be a composite sheet formed by impregnation or lamination. The substrate or reinforcement for the composite sheet may be a nonwoven or woven cloth of glass fibers.

The sheet of the epoxy resin composition which is in a substantially uncrued state is subsequently punched out to make an epoxy resin molded article of desired shape. Punching may be accomplished by using a punching machine equipped with a punching die, Thomson die cutter, or engraving cutter. The term "substantially uncured state" means that crosslinking has proceeded to some extent but is not yet complete. The sheet should be 0.01 to 10 mm thick. With a thickness smaller than 0.01 mm, the sheet does not withstand shocks it encounters during punching and is hard to handle on account of its very low strength. Conversely, with a thickness greater than 10 mm, the sheet cannot be punched accurately. It is important that the sheet should be kept at 15° C. to 70° C. at the time of punching. The sheet is very brittle at temperatures lower than 15° C. and is sticky at temperature higher than 70° C. Brittle sheet and sticky sheet do not permit satisfactory punching. For this reason, the punching machine used in the present invention should preferably be provided with a hot plate or constant temperature bath which keeps the sheet at a temperature in the range of 15° C. to 70° C. which is suitable for punching. Moreover, in the case where a punching die is used, it also needs temperature control. In actual operation, for example, punching may be accomplished in line with extrusion; that is, the sheet emerging from the extruder is cooled to 70° C. or below by the cooling roll and then punched before being cooled below 15° C. In such a case, the punching machine does not need an apparatus to control the sheet temperature.

The thus obtained adhesive epoxy resin molded article (hereinafter referred to simply as "molded article") is used for bonding or sealing. That is, it is brought into contact with an adherend or an object to be sealed, and then heated to a temperature higher than its melting point, so that it melts, wetting the adherend or an object to be sealed and flowing to a desired position, and cures to complete bonding or sealing.

For the molded article to exhibit the best bonding or sealing performance, it should have a proper shape such as rod, flat plate, ring, frame, film, pellet, and narrow strip, which may be holed if necessary.

According to the process of the present invention, it is possible to produce adhesive thermosetting molded articles of small size and shape which are free of cracks and chipping. They are satisfactorily used for bonding and sealing small parts such as electronics parts which are recently increasing in number. The molded articles of the present invention are strong enough to be handled by the automated machines such as parts feeders and robots. Therefore, they will contribute to process automation and cost reduction. In addition, they are not broken or abraded by handling and vibration they encounter during transportation, and they are free of powder which contaminates parts or adherend. Being compact, the molded articles of the present invention do not leave voids in them after bonding or sealing, which leads to firm bonding.

The adhesive epoxy resin molded articles of the present invention enable easy assembling of parts by bonding or sealing, because they have a controlled volume required for bonding and sealing, they have a controlled shape that facilitates the positioning of adherends or objects to be sealed, and they have applicability to the automated system such as robots because they are solid and have high strength. Being composed mainly of an epoxy resin, they are superior in heat resistance, chemical resistance, solvent resistance, electrical properties, adhesiveness and bond strength.

The invention will be described in more detail with reference to the examples and comparative examples. In examples, parts are all by weight.

EXAMPLES 1 to 4

First mixing step

Those components shown in Table 1, excluding carbon black and hardener, were mixed in a kneader at 165° C. for about 1 hour. After cooling to room temperature, the mixture was roughly crushed into particles smaller than 3 mm.

Second mixing step

The mixture obtained in the first mixing step was incorporated with carbon black and hardener as shown in Table 1 for 100 parts of the epoxy resin in the mixture. All the components were melted and mixed by an extruder whose cylinder temperature was controlled at 100° C. Thus there were obtained an epoxy resin mixture in the form of pellets about 3 mm in size.

Sheet-forming step

The pellets of the mixture obtained in the second mixing step were extruded into an uncured sheet, 0.45 mm thick and 155 mm wide, through a 50-mm extruder equipped with a T-die having a 200-mm long lip.

Punching step

The sheet was cut to a size, 20 mm wide and 500 mm long. The cut sheet was punched out by means of a punch press and punching die. There were obtained adhesive epoxy resin molded articles which are free of cracking and deformation. Incidentally, the punch press is provided with a constant temperature bath surrounding the punching die. Prior to punching, the punching die and the sheet were preheated to 40° C. The molded article after punching measures 3 mm by 4.7 mm and 0.45 mm thick and has an elliptic hole, 1 mm by 3.2 mm, at the center.

The obtained molded articles are not sticky and have no tendency toward blocking at room temperature. To examine their strength, 10000 pieces of the molded articles were shaken on a parts feeder for 1 hour. They did not crack nor chip at all, and they did not yield any powder resulting from abrasion. The molded article was heated at 150° C. for 2 hours, during which melting and curing took place. Upon checking the inside of the cured article, no voids were found.

The molded article was also used to seal the terminals of electronic parts. It was confirmed that it firmly sticks to the melamine resin body of an electronic part and also to silver-plated copper terminals. The molded article attached to the copper terminal remained unchanged when a soldering iron heated to 350° C. was kept in contact with the terminal for 5 seconds. In other words, it has good resistance to soldering heat.

COMPARATIVE EXAMPLE 1

A mixture of the same composition as in Example 1 was prepared under the same conditions as in Example 1, except that the hardener (diaminodiphenylmethane) was added in the first mixing step. The resulting mixture was roughly crushed into particles smaller than 3 mm.

In the second mixing step, the mixture was incorporated with 2 parts of the remaining carbon black, and all the components were melted and mixed by an extruder whose cylinder temperature was controlled at 100° C. Thus there was obtained an epoxy resin mixture in the form of pellets about 3 mm in size. The pellets had a rough surface which indicated that the curing reaction had occurred in the composition.

Sheet-forming step

The pellets of the epoxy resin mixture obtained in the second mixing step were extruded into a sheet in the same manner as in Example 1. The resulting sheet had a rough surface and poor quality because of uneven extrusion.

Punching step

The sheet was punched out in the same manner as in Example 1; but the resulting molded article was poor. It did not melt even when heated to 150° C. Thus it is quite useless as an adhesive.

COMPARATIVE EXAMPLE 2

A composition was made from an epoxy resin having a molecular weight of 174 (Denakole EX-810, a product of Nagase Kasei Co., Ltd.) The molded articles produced from the composition were so sticky that they were not separable from one another once they stick to one another. In addition, they were so weak that they were easily deformed by a small external force.

COMPARATIVE EXAMPLE 3

A composition was made from an epoxy resin having a molecular weight of 8000 (the resin obtained in Example 1 of Japanese Unexamined Patent Publication No. 92320/1985). The complete dispersion of this epoxy resin was possible only when the second mixing step was performed at higher than 150° C. However, the mixing at 150° C. brought about curing reaction during mixing, and the mixture could not be formed into a sheet.

COMPARATIVE EXAMPLE 4

A composition was made from a thermoplastic polyester resin having a molecular weight of 3700. (This resin was prepared by hydrolyzing a polyester resin having a molecular weight of 17000 until the desired molecular weight was reached.) The molded articles produced from the composition were very sticky and they were so weak that they deformed easily when subjected to only a small external force.

COMPARATIVE EXAMPLE 5

A composition was prepared in the same manner as in Example 2 except that the amount of the thermoplastic resin was changed to 2 parts. The resulting molded article was nonsticky and had good resistance to soldering heat. However, it was so brittle that it easily cracked or chipped during punching.

COMPARATIVE EXAMPLE 6

A composition was prepared in the same manner as in Example 2 except that the amount of the thermoplastic resin was changed to 50 parts. The resulting molded article was nonsticky and had high strength. Nevertheless, it was poor in resistance to soldering heat and it partly melted upon heating, even after curing at 150° C. for 2 hours.

COMPARATIVE EXAMPLE 7

The procedure of Example 1 was repeated except that the constant temperature bath surrounding the punching die was set at 12° C. so that the punching die and the sheet were preheated to 12° C. Upon punching, all of the sheet cracked, and the desired molded articles were not obtained.

COMPARATIVE EXAMPLE 8

The procedure of Comparative Example 7 was repeated except that the punching temperature was set at 75° C. Upon punching, the sheet stuck to the punching die and it was difficult to remove the punched article from the punching die without great deformation.

TABLE 1

| | | Example | | | | Com. Ex. | | | | | |
|---|---|---|---|---|---|---|---|---|---|---|---|
| | MW | 1 | 2 | 3 | 4 | 1 | 2 | 3 | 4 | 5 | 6 |
| Epoxy resin | | | | | | | | | | | |
| Bisphenol A type epoxy | 900 | | | 50 | 100 | | | | | | |
| Bisphenol A type epoxy | 1600 | 75 | 100 | | | 75 | | | 100 | 100 | 100 |
| High-molecular-weight polyfunctional epoxy | 8000 | | | | | | | 100 | | | |
| Brominated bisphenol A type epoxy | 760 | 25 | | 25 | | 25 | | | | | |
| o-Cresol novolak type epoxy | 2300 | | | 25 | | | | | | | |
| Aliuphatic epoxy | 174 | | | | | | 100 | | | | |
| Thermoplastic resin | | | | | | | | | | | |
| Polyamide resin (Macromelt 6300) | 2000 | 5 | | | | | | | | | 50 |
| Polyester resin (Vylon RV-200) | 17000 | 25 | | 30 | | 25 | 25 | 10 | | 2 | |
| Polyurethane resin | 12000 | | | | 10 | | | | | | |
| Polyester resin | 3700 | | | | | | | | 25 | | |
| Additives | | | | | | | | | | | |
| Silica powder | | 50 | 50 | | | 50 | 50 | 20 | 50 | 50 | 50 |
| Aluminum hydroxide powder | | | | 50 | | | | | | | |
| Glass fiber | | | | | 10 | | | | | | |
| Antimony trioxide | | 10 | 10 | 10 | 10 | 10 | 10 | 10 | 10 | 10 | 10 |
| Silane coupling agent | | 1 | 1 | 1 | 1 | 1 | 1 | 1 | 1 | 1 | 1 |
| Zinc stearate | | 0.5 | 0.5 | 0.5 | 0.5 | 0.5 | 0.5 | 0.5 | 0.5 | 0.5 | 0.5 |
| Carbon black | | 2 | 2 | 2 | 2 | 2 | 2 | 2 | 2 | 2 | 2 |
| Curing agent | | | | | | | | | | | |
| Diaminodiphenylmethane | | 7.2 | 5.4 | 14 | 10 | 7.2 | 44 | 5.9 | 5.4 | 5.4 | 5.4 |
| Properties | | | | | | | | | | | |
| Nonstickiness of molded article | | G | G | G | G | *1 | B | *1 | B | G | G |
| Strength of molded article | | G | G | G | G | *1 | B | *1 | B | B | G |
| Resistance to soldering heat of cured article | | G | G | G | G | *1 | G | *1 | G | G | B |

(Note)
G: Good
B: Bad
*1: Impossible to mold

We claim:

1. A process for producing an adhesive epoxy resin molded article which comprises molding into a 0.01 to 10 mm thick film or sheet in a substantially uncured state an epoxy resin composition which is obtained by melt-mixing 100 parts by weight of an epoxy resin with 25 to 33 parts by weight of polyester resin, alone or in combination with other components than a hardener in a first mixing step and then with a hardener alone or in combination with other components in a second mixing step, said epoxy resin having a number-average molecular weight of at least 200 and lower than 5000 and said polyester resin having a number-average molecular weight of at least 5000, and subsequently punching out the film or a sheet at temperatures higher than 15° C. and lower than 70° C. to obtain said molded article.

2. An adhesive epoxy resin molded article obtained by the process of claim 1.

* * * * *